United States Patent
Bueti et al.

(10) Patent No.: US 7,275,011 B2
(45) Date of Patent: Sep. 25, 2007

(54) METHOD AND APPARATUS FOR MONITORING INTEGRATED CIRCUIT TEMPERATURE THROUGH DETERMINISTIC PATH DELAYS

(75) Inventors: Serafino Bueti, Waterbury, VT (US); Adam J. Courchesne, Belchertown, MA (US); Kenneth J. Goodnow, Essex, VT (US); Jason M. Norman, Essex Junction, VT (US); Stanley B. Stanski, Essex Junction, VT (US); Scott T. Vento, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 11/160,601

(22) Filed: Jun. 30, 2005

(65) Prior Publication Data
US 2007/0005290 A1    Jan. 4, 2007

(51) Int. Cl.
*G01K 7/01* (2006.01)
(52) U.S. Cl. ..................... 702/130; 374/102
(58) Field of Classification Search ............ 702/79, 702/89, 99, 125, 130, 132, 136; 327/261, 327/262, 269; 361/103; 374/102–104, 57, 374/178
See application file for complete search history.

(56) References Cited

U.S. PATENT DOCUMENTS

| | | | |
|---|---|---|---|
| 5,281,874 A * | 1/1994 | Sorrells et al. ............. | 327/269 |
| 5,457,719 A | 10/1995 | Guo et al. ................... | 375/373 |
| 5,513,235 A | 4/1996 | Douglass et al. ............. | 377/25 |
| 5,835,553 A | 11/1998 | Suzuki ........................ | 377/25 |
| 5,852,616 A | 12/1998 | Kubinec ..................... | 714/718 |
| 5,890,100 A * | 3/1999 | Crayford ..................... | 702/130 |
| 5,902,044 A | 5/1999 | Pricer et al. ................ | 374/112 |
| 5,943,206 A | 8/1999 | Crayford ..................... | 361/103 |
| 6,090,152 A | 7/2000 | Hayes et al. .................... | 716/6 |
| 6,208,172 B1 * | 3/2001 | Evoy et al. ................... | 327/12 |
| 6,438,503 B1 | 8/2002 | Chiang ........................ | 702/132 |
| 6,927,580 B2 * | 8/2005 | Wuidart et al. ............. | 324/617 |
| 2003/0043615 A1 * | 3/2003 | Lin ............................. | 365/141 |
| 2004/0159904 A1 * | 8/2004 | Clabes et al. ............... | 257/467 |

FOREIGN PATENT DOCUMENTS

| | | |
|---|---|---|
| JP | 62-254827 | 12/1986 |
| JP | 62-163942 | 7/1987 |
| JP | 11-248545 | 9/1999 |

* cited by examiner

*Primary Examiner*—John Barlow
*Assistant Examiner*—Manuel L. Barbee
(74) *Attorney, Agent, or Firm*—Cantor Colburn LLP; Michael J. LeStrange (57) ABSTRACT

An apparatus for monitoring the temperature of an integrated circuit device includes a conductive wiring pattern formed on the integrated circuit device, extending into areas of the device to be monitored. A deterministic signal source is configured to generate a deterministic signal along the conductive wiring pattern, with one or more return paths tapped from selected locations along the pattern. A temperature change determination circuit is coupled to the one or more return paths and to a reference signal taken from the deterministic signal source. The circuit is configured to determine a delay between the reference signal and a delay signal traveling through at least a portion of the wiring pattern and a corresponding one of the return paths.

16 Claims, 13 Drawing Sheets

METHOD AND APPARATUS FOR MONITORING INTEGRATED CIRCUIT TEMPERATURE THROUGH DETERMINISTIC PATH DELAYS

BACKGROUND

The present invention relates generally to integrated circuit devices, and, more particularly, to a method and apparatus for monitoring integrated circuit temperature through path delays.

In an integrated circuit device, the various functions performed by the logic elements on a chip are dependent on variations in the chip operating conditions, such as temperature. Ideally, the operating temperature for processing of a digital signal by a device, such as a gate, is constant and within the parameter range(s) assumed in the digital design. As a practical matter, the operating temperature associated with signal processing by a given device can vary with time, depending upon the present circumstances and recent history of operation of the device. Moreover, chips are often contained in enclosures that may experience extreme variations in temperature. Consequently, if the device temperature varies too much from the assumed idealized value, undesirable device responses such as poor chip performance or even device malfunction can occur.

On the other hand, when a chip fails to perform properly or crashes, any one or more of a variety of factors could actually be the cause. In order to determine the exact cause of a chip failure, complex recording devices may be used to store information on the operating state of the chip before the failure. These recording devices can store specific information such as the chip temperature, chip operating voltages and other process variables. However, these devices typically require the use of complex analog sensors or fast analog-to-digital (A/D) converters that can detect and report the status of these variables on a real time basis. Such recording devices may also store the chip states in various registers located on the chip at predetermined intervals.

One drawback associated with these types of recording devices is the large amount of space that they consume on the chip, as well as the increased amount of processing needed to continually update the status of all the variables. Still another drawback is that analog sensors are often sensitive to noise caused by digital switching operations and other factors. Additionally, the cost of such recording devices with a number of analog sensors increases with the complexity of the particular device.

Accordingly, it would be desirable to be able to determine which specific locations within an IC that may exhibit temperature fluctuations due to process variation over the IC or the function in which the circuitry in that location is performing. Furthermore, having cross IC temperature information is useful for controlling intra-chip voltage levels, and to provide a designer with temperature information during module testing. This information is preferably obtained in a manner that uses existing device features, to the extent possible.

SUMMARY

The foregoing discussed drawbacks and deficiencies of the prior art are overcome or alleviated by an apparatus for monitoring the temperature of an integrated circuit device. In an exemplary embodiment, the apparatus includes a conductive wiring pattern formed on the integrated circuit device, extending into areas of the device to be monitored. A deterministic signal source is configured to generate a deterministic signal along the conductive wiring pattern, with one or more return paths tapped from selected locations along the conductive wiring pattern. A temperature change determination circuit is coupled to the one or more return paths and to a reference signal taken from the deterministic signal source. The temperature change determination circuit is configured to determine a delay between the reference signal and a delay signal traveling through at least a portion of the conductive wiring pattern and a corresponding one of the one or more return paths.

In another embodiment, a method for monitoring the temperature of an integrated circuit device includes defining a conductive wiring pattern on the integrated circuit device, extending into areas of the device to be monitored. A deterministic signal is generated along the conductive wiring pattern, and one or more return paths are tapped from selected locations along the conductive wiring pattern. A temperature change determination circuit is coupled to the one or more return paths and to a reference signal taken from the deterministic signal source, the circuit configured to determine a delay between the reference signal and a delay signal traveling through at least a portion of the conductive wiring pattern and a corresponding one of the one or more return paths.

BRIEF DESCRIPTION OF THE DRAWINGS

Referring to the exemplary drawings wherein like elements are numbered alike in the several Figures.

DETAILED DESCRIPTION

Disclosed herein is a method and apparatus for acquiring and deriving temperature information with respect to specific locations within an integrated circuit (IC). It is known that for a given signal trace/path on an IC, there exists a delay associated with this path and, furthermore, this delay is proportional to the temperature of the IC along that path. Accordingly, by correlating this delay to an expected nominal delay (i.e., a baseline delay), a relative difference in temperature for a given path may be determined. Moreover, by tapping a given signal path at different locations, one or more "hot spots" associated with a specific region within the path may be isolated. This principle is illustrated by the schematic diagram of FIG. 1.

Figure 1:
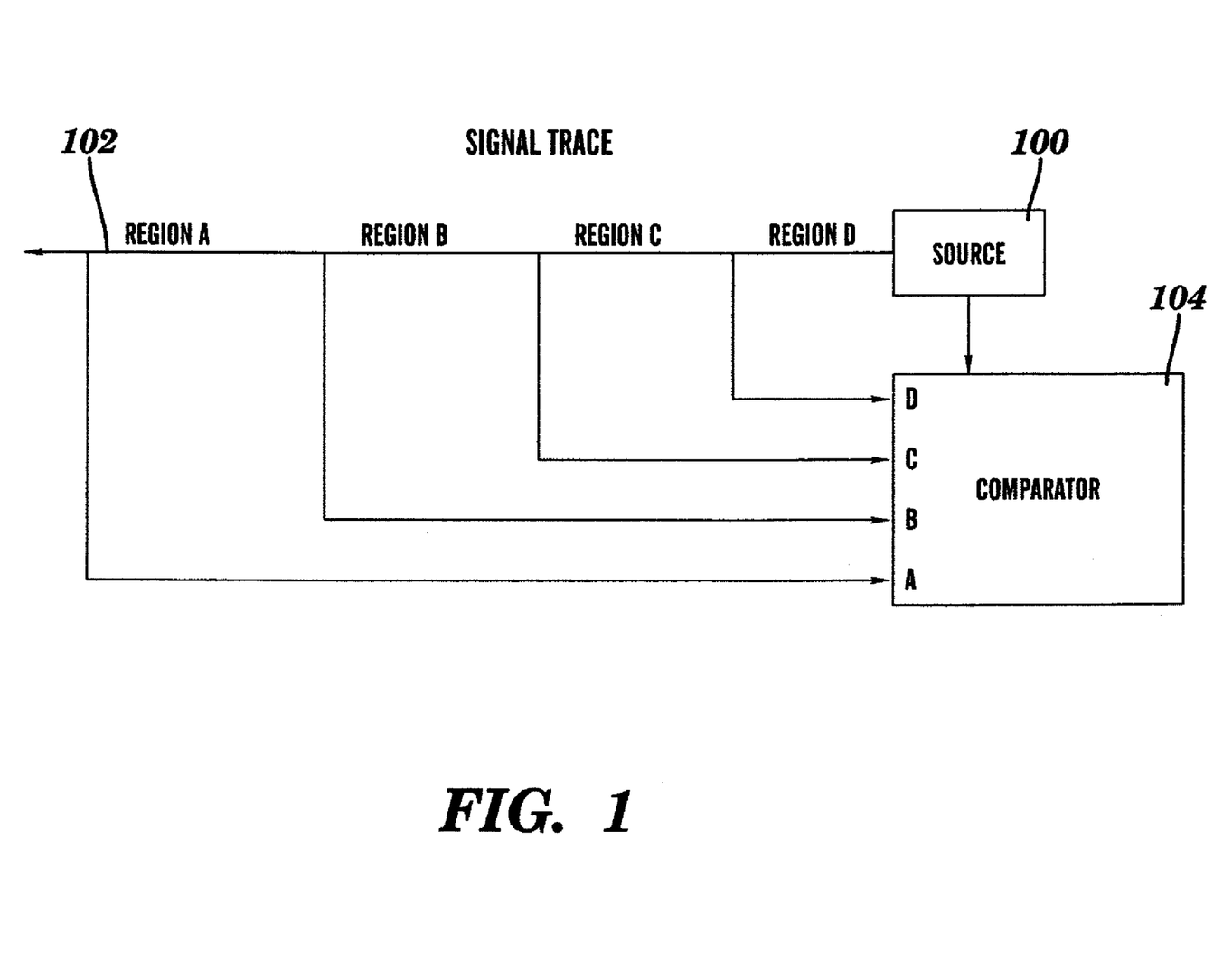
FIG. 1 is a schematic diagram illustrating the tapping of locations along a signal path for monitoring integrated circuit temperature using path delay information.

A signal source 100 provides a signal sent through a line 102, which is representative of a conductive path along a semiconductor chip. For any given point in time, return signals A, B, C and D (taken along various points along the line 102) are sent back to a comparator 104, where each return path is compared against the source signal. Sometime after reset, when the IC is running under nominal conditions, a calibration sequence occurs. Each return signal (A, B, C, D) is compared against the source signal and the difference in delay is stored. This recorded difference is used later to determine if a path's delay has grown beyond tolerable limits. Differences in a single path comparison are interpreted as a temperature difference somewhere from the source to the taping point. After each of return path comparisons is made, the location of the hot spot(s) may be determined.

Once the temperature information is in digital form, it may thereafter be stored in an internal register to be used by the IC's internal circuitry, external circuitry, or by the operating system. This information can be useful at both a hardware and software level. Exemplary uses of temperature information may include adjusting the supply voltage to a voltage island or alerting the parent system of the elevated temperature situation. Additionally, such information is particularly useful for monitoring and controlling on-chip power distribution, or alerting the operating system whenever unexpected power/temperature situations arise.

Figure 2:
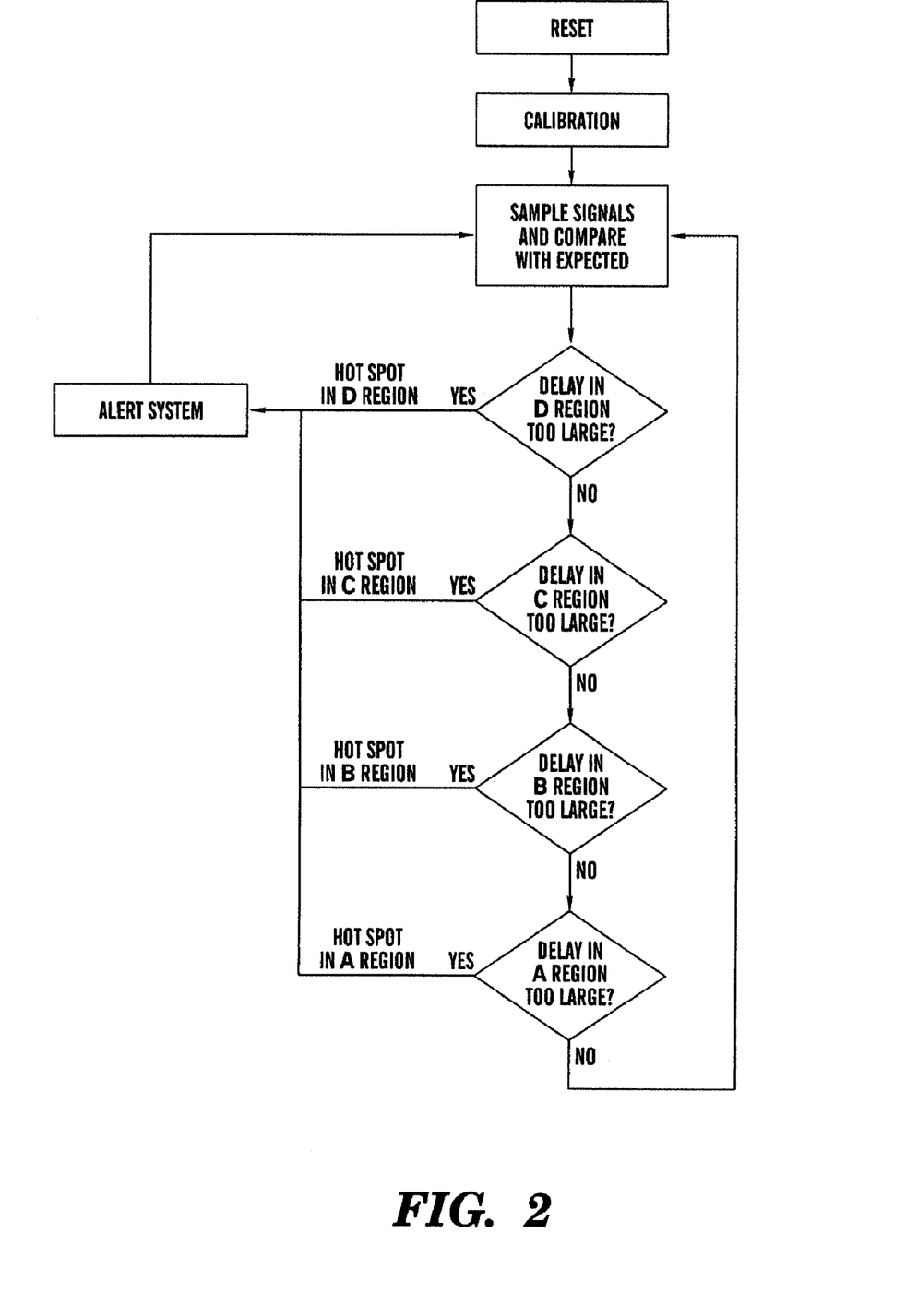
FIG. 2 is a flow diagram illustrating a decision process for analyzing the delay information from the tapping points in FIG. 1.

An exemplary decision process is shown in FIG. 2. In this simplified example, single region hotspots are determined by successively checking outward points along the wiring trace with respect to the signal source. Although any signal trace on an IC may be tapped for purposes of temperature determination, the signal should have a deterministic pattern in order for desired reliability of the above process. As such, a clock signal is a particularly suitable candidate for this purpose.

Figure 3:
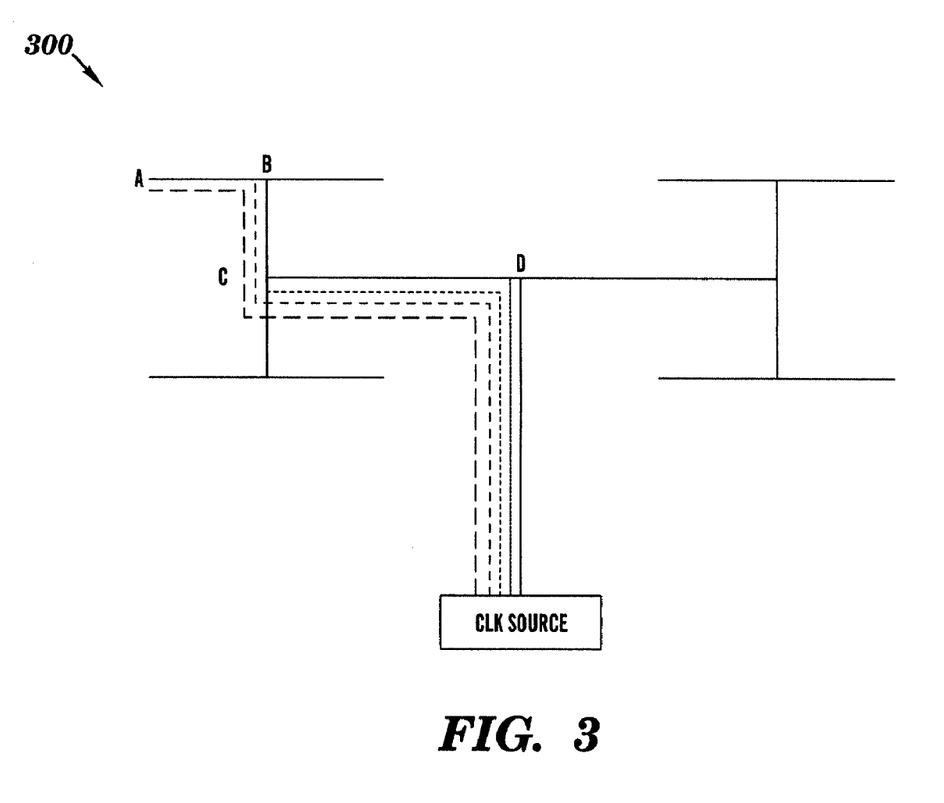
FIG. 3 is schematic diagram of a clock tree suitable for implementing an apparatus for monitoring integrated circuit temperature, in accordance with an embodiment of the invention.

Referring now to FIG. 3, there is shown an exemplary simplified schematic diagram of a clock tree 300 that may be tapped to provide the desired delay/temperature information. Within a typical integrated circuit, a defined clock tree already exists. A properly balanced clock tree (such as the simplified one shown in FIG. 3) resembles an H-structure for delay matching purposes. In accordance with an embodiment of the invention, at various branch points the clock tree signal is tapped and sent back to a central location (reference location) and measured against a reference clock signal. Even under nominal operating conditions, the return signals are expected to be delayed with respect to the reference clock signal; however, it is the magnitude of that delay that determines the change in temperature in that area of the chip.

As illustrated in FIG. 3, as a particular clock signal travels outward along a particular path and reaches branch points, it is fed back at points D, C, B and A to the original clock source. These return paths are preferably routed as closely to the original signal path as possible so that a situation does not occur where a return path runs across a particular hot spot but its original path does not. The return clock signals are then compared against the source clock signal as indicated earlier. In instances where the delay from a particular point in the trace back to the clock source is too large (e.g., greater than a clock cycle), then the corresponding compare circuitry may be replicated as needed at selected remote branches rather than locating the entire compare circuitry at the clock source.

Figure 4:
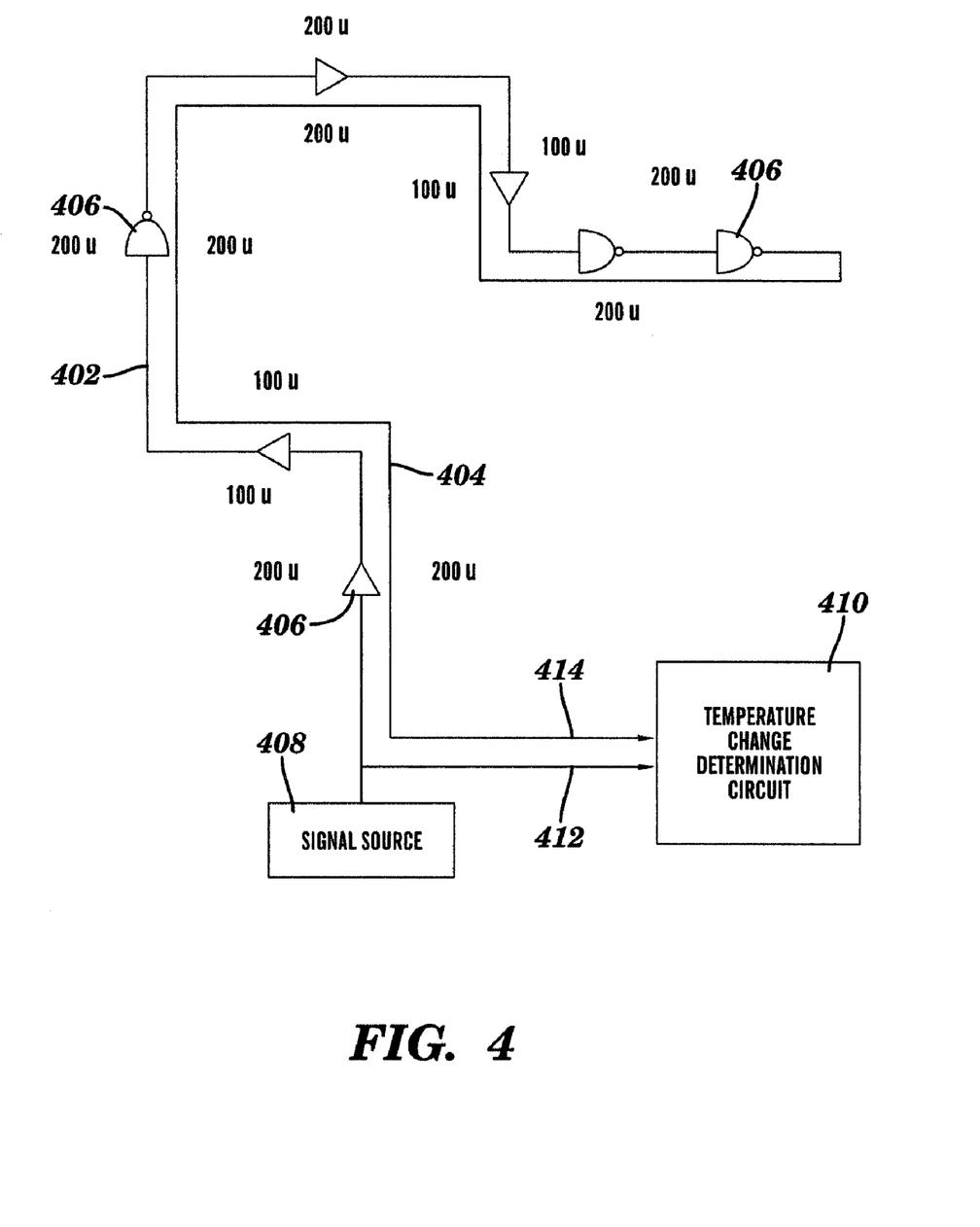
FIG. 4 is a schematic diagram illustrating a specific example of legs of a signal path of an integrated circuit, and a corresponding series of legs in a return path, in accordance with a further embodiment of the invention.

FIG. 4 is a schematic diagram illustrating a specific example of legs of an existing signal path 402, and a corresponding series of legs in a return path 404 (which may be tapped at various points for isolation of hot spots. In the example depicted, the signal path 402 includes various gate structures 406 representative of delays resulting from passing a signal (e.g., a clock signal from source 408) through actual functional elements of an integrated circuit device. The return path 404 is configured so as to closely approximate the actual length of the various signal path branches. For ease of illustration, the signal trace and return path lengths are illustrated as 100 micron and 200 micron lengths by way of example. A temperature change determination circuit 410 is also shown in FIG. 4, and receives a reference clock signal 412 in addition to one or more tapped clock signals 414 as inputs thereto.

Figure 5:
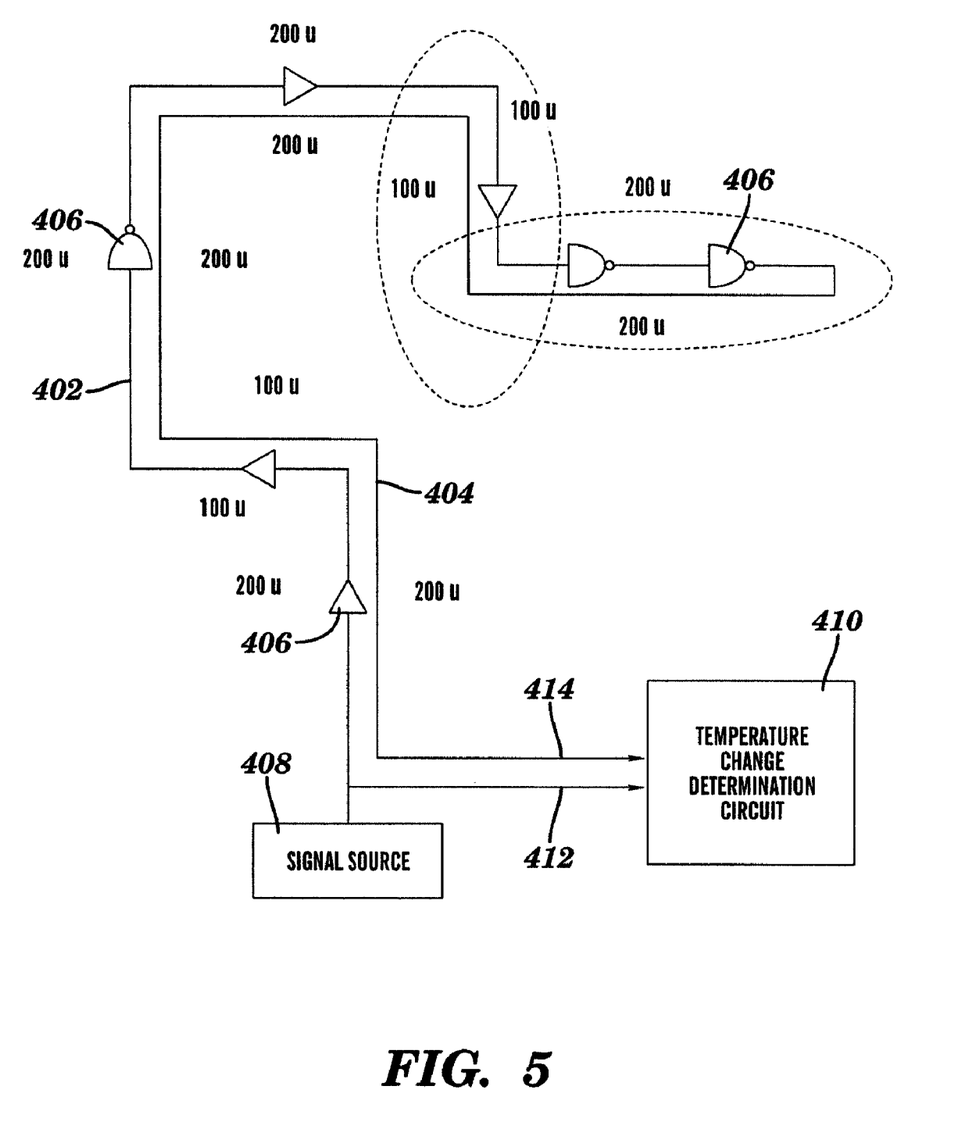
FIG. 5 illustrates a hot spot area on the integrated circuit trace of FIG. 4.

Furthermore, in the example depicted, it is assumed that for each 100 micron length of wire, the delay of a signal passing therethrough increases by about 0.004 picoseconds (ps) per degree Celsius (° C.), and for each 200 micron length of wire, the delay of a signal passing therethrough increases by about 0.016 ps per ° C. Within the signal path, it is assumed that the delay of a signal passing through a buffer delay increases by about 1.64 ps per ° C., and the delay of a signal passing through a NAND gate increases by about 0.18 ps per ° C. Thus, if the circled areas of the IC shown in FIG. 5 were operating 10° C. above nominal, then the delay through a signal passing through those portions of the signal and return paths would be increased as follows:

total 100 µm wire delay=2 lengths×(0.004 ps/° C.)×10° C.=0.08 ps total 200 µm wire delay=2 lengths×(0.016 ps/° C.)×10° C.=0.32 ps total buffer delay=1 buffer×(0.18 ps/° C.)×10° C.=1.8 ps total NAND gate delay=2 gates×(1.64 ps/° C.)×10° C.=32.8 ps total overall delay increase=(0.08 ps)+(0.32 ps)+(1.8 ps)+(32.8 ps)=35 ps It should be noted that the above exemplary level of delay increase over nominal temperature conditions (35 ps) is within the detection range of current technology using digital delay elements, for example. It should also be noted that the exemplary schematic diagram of FIGS. 4 and 5 illustrate a single path within an IC, and that multiple signal paths would be included to provide the desired capability of pinpointing a precise location of a heat source.

Figure 6:
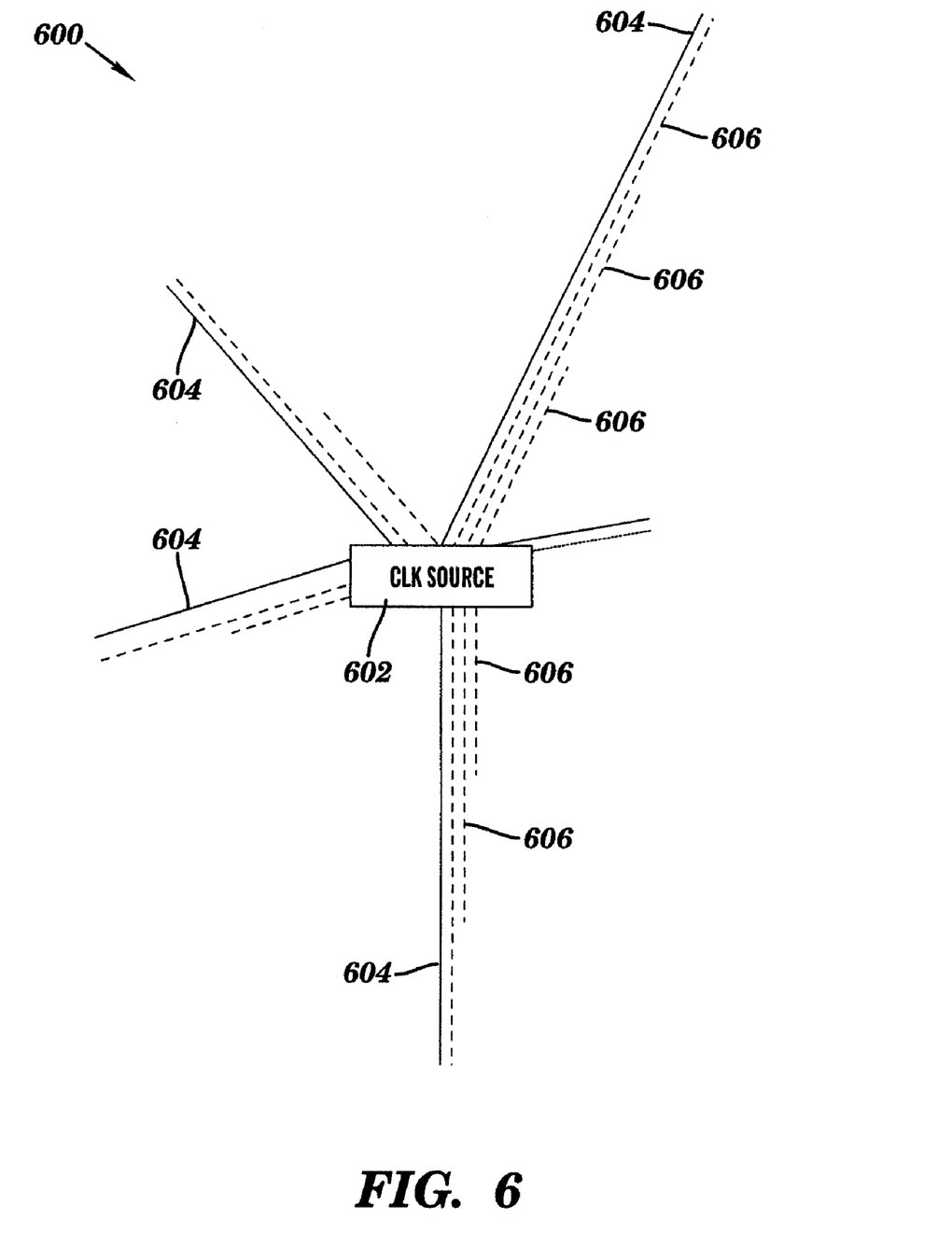
FIG. 6 is a schematic diagram of one or more star structures configured for determining integrated circuit temperature, in accordance with an alternative embodiment of the invention.

In the event that a particular area(s) of an IC does not provide an existing structure for propagating a deterministic signal, another acceptable approach may be to configure one or more "star" type structures 600 to serve the same purpose, such as that shown in FIG. 6. In an exemplary embodiment, each star 600 would have its own clock source 602 and would further include "fingers" (i.e., traces 604) that spread out to areas of concern within the IC, wherein each finger 604 may be of a specified length and direction. Depending on the individual length of a finger 604, there may be multiple return paths 606 associated therewith (dashed lines), located along the length of the finger. The larger the number of return paths associated with a finger trace 604, the greater the resolution with respect to isolating temperature changes on the IC. Even where a particular IC includes a symmetric clock tree, the star structure embodiment of FIG. 6 may still be implemented where it is desired to leave a clock tree uninhibited with return paths and tap points. Moreover, the use of a such a star structure gives a designer the ability run pattern across specific areas of the IC that are of concern and might not otherwise be reached by other wiring, such as clock paths. Again, multiple stars structures 600 may be created in temperature sensitive areas of the IC.

Figure 7:
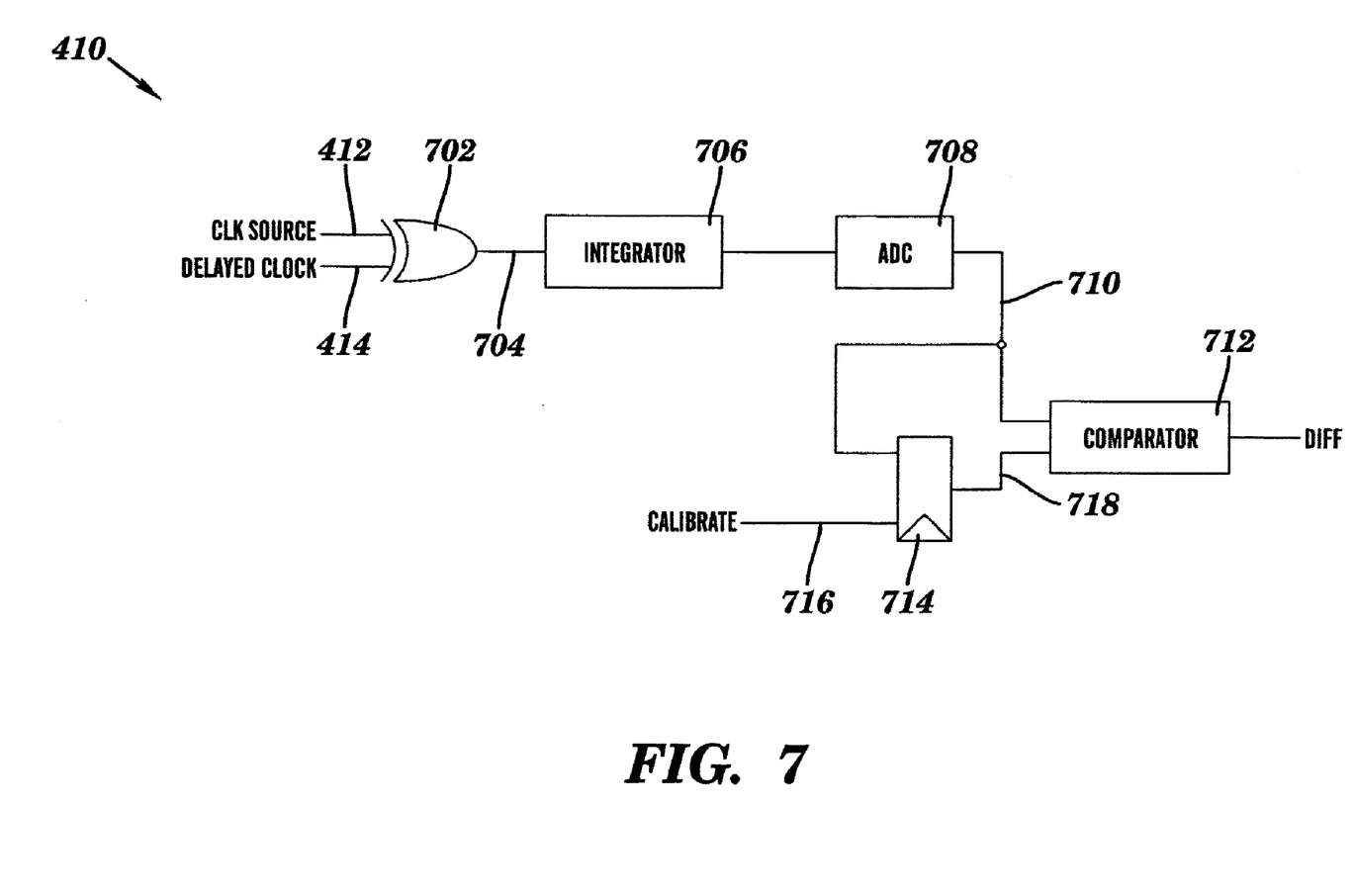
FIG. 7 is a schematic diagram of an analog circuit embodiment of the temperature change detection circuitry utilized by the present invention embodiments.

The temperature change determination circuitry 410 (shown in FIGS. 4 and 5) may be implemented in a number of ways. For example, FIG. 7 is a schematic diagram of an analog implementation of the circuitry 410, in which an exclusive OR (XOR) gate 702 receives both a reference signal (e.g., reference clock signal 412) and a delayed clock signal (e.g., delayed clock signal 414). It will be noted that the circuitry 410 will include a separate gate for each tap point in the wiring structure. The amount of time that the value reference clock signal 412 differs from the delayed clock signal represents the extent of the delay. During these periods, the output of XOR gate 702 is high, and will cause the output of integrator 706 (e.g., an op-amp) to increase and add to the overall magnitude of the difference. The analog output of the integrator 706 is coupled to analog-to-digital (ADC) converter 708.

During calibration of the device, such as when the IC is running under nominal temperature conditions, the output 710 of ADC 708 represents a nominal delay due to the devices and wiring lengths. As such, the output 710 is sent to both a digital comparator 712 and a storage latch 714 that is activated by a calibrate control signal 716. Thus, when the calibrate signal 716 is activated, the current value of the ADC output 710 is stored within the latch 714, and is coupled to the other input of comparator 712 as signal 718.

Figure 8:
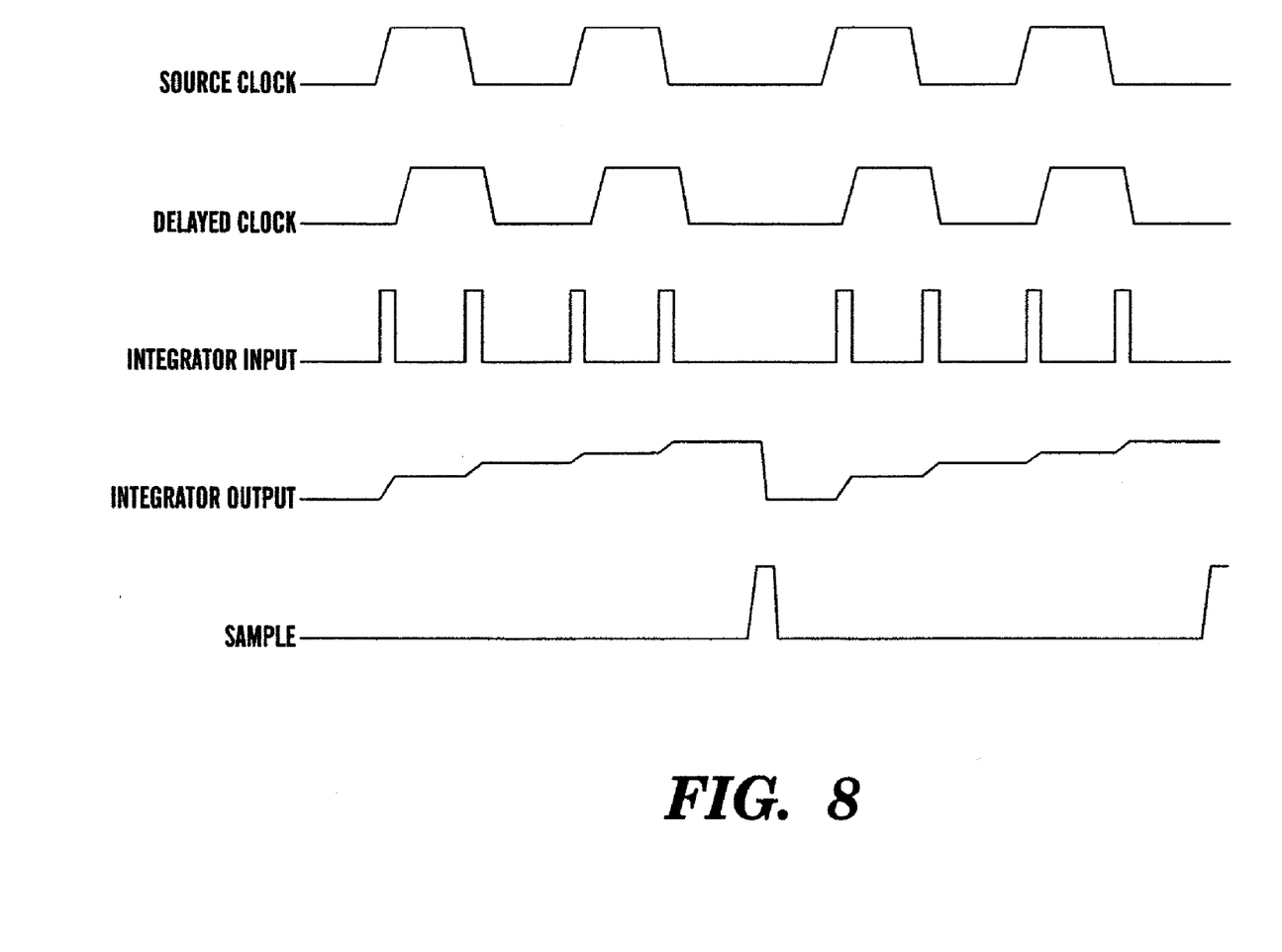
FIG. 8 is a waveform timing diagram illustrating the operation of the circuit in FIG. 7.

After a predefined period (e.g., 1 to 2 cycles) the integrator circuit 706 is sampled and then reset such that the output therefrom will not continue to increase in magnitude over time. FIG. 8 is an exemplary waveform diagram illustrating the operation of the analog embodiment of circuitry 410. During operation of the IC, if an area corresponding to the delayed clock path increases in temperature, the longer delay will result in a higher magnitude of integrator output with respect to the calibrated baseline value stored in latch 714. This difference will in turn be reflected by the output of comparator 712, so that an appropriate indication signal can be generated.

Figure 9:
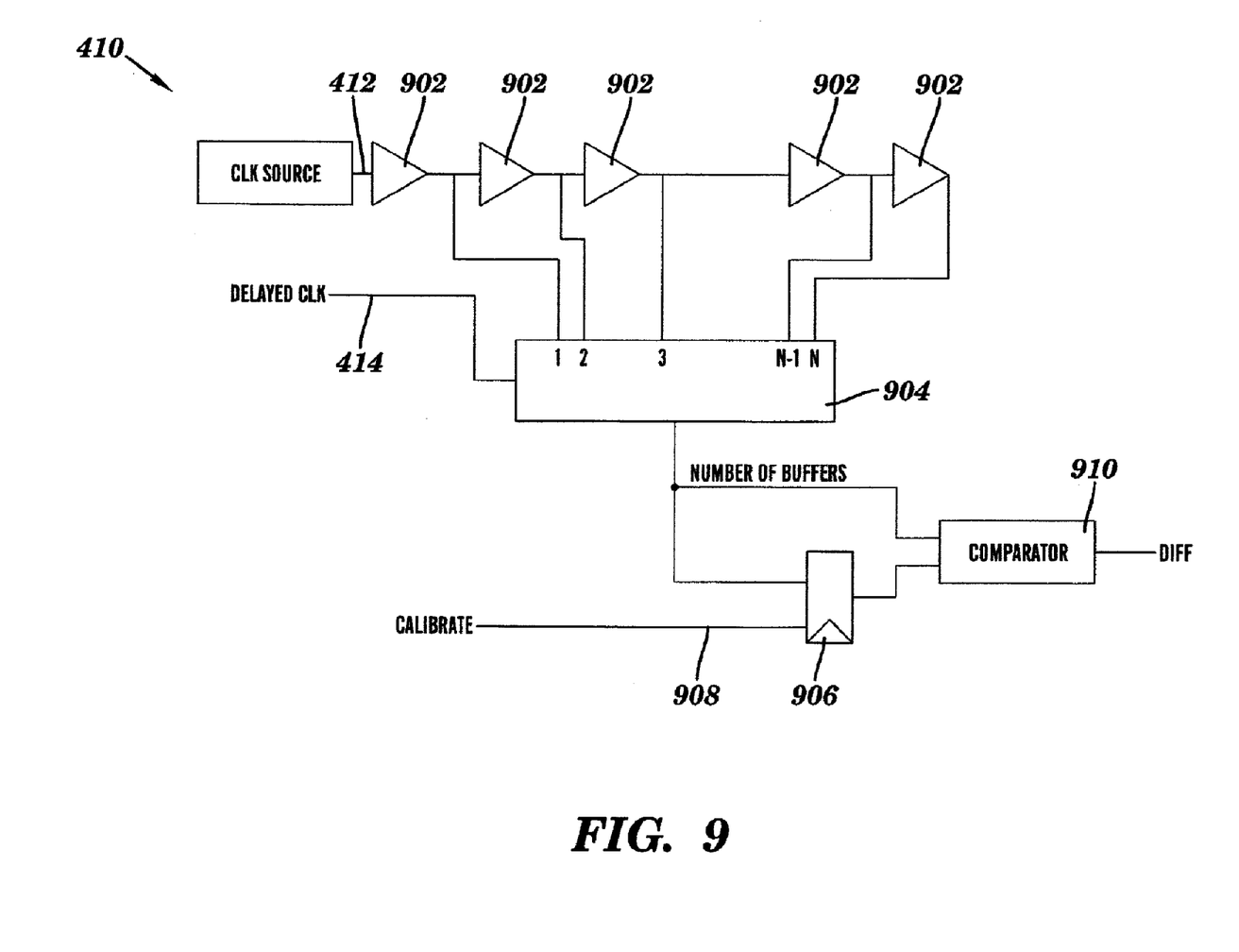
FIG. 9 is a schematic diagram of a digital circuit embodiment of the temperature change detection circuitry utilized by the present invention embodiments.

FIG. 9 is a schematic diagram of a digital implementation of the temperature change determination circuitry 410, in which the reference clock signal 412 is passed through a chain of N buffers 902 each having the same delay. The delayed clock signal 414 is compared to the outputs of each stage of the buffers 902 within the chain by comparator 904. The output of comparator 904 represents the specific number of buffers 902 that most closely matches the delay of the delayed clock 414. As is with the case with the analog compare circuitry, the output of comparator 904 may be stored within a latch upon activation of a calibrate signal 908 to store a baseline value therein during nominal temperature conditions.

For example, at a nominal temperature, the value of the delayed clock signal 414 with respect to the reference clock signal 412 might be two buffer stages. During elevated temperatures, the magnitude of the delayed clock signal 414 could increase such it is closest to perhaps 3 (or a higher number) of buffer stages. This will result in a differential signal at the output of comparator 910 to indicate an elevated temperature condition.

Figure 10:
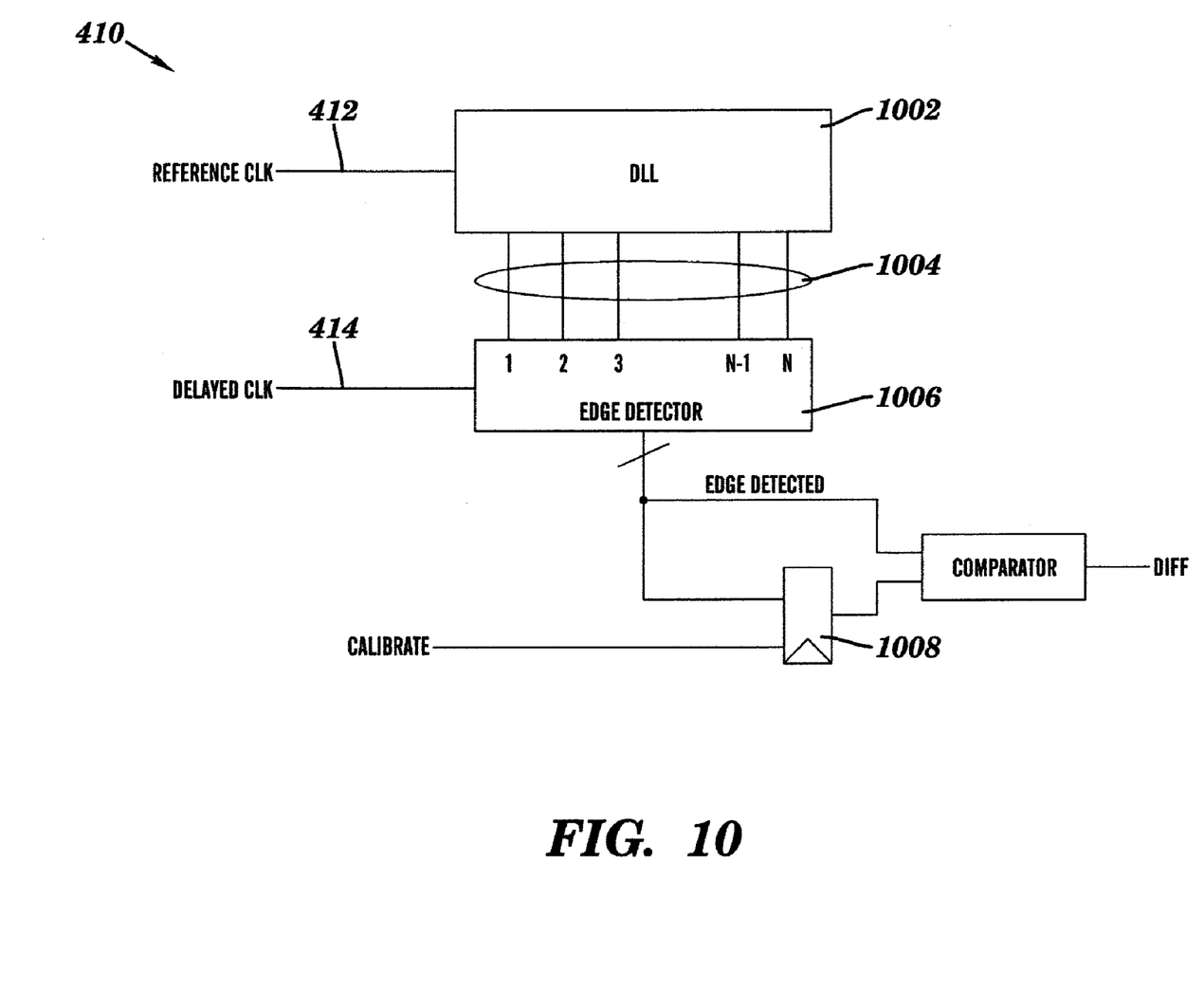
FIG. 10 is a schematic diagram of another digital circuit embodiment of the temperature change detection circuitry utilized by the present invention embodiments.
Figure 11:
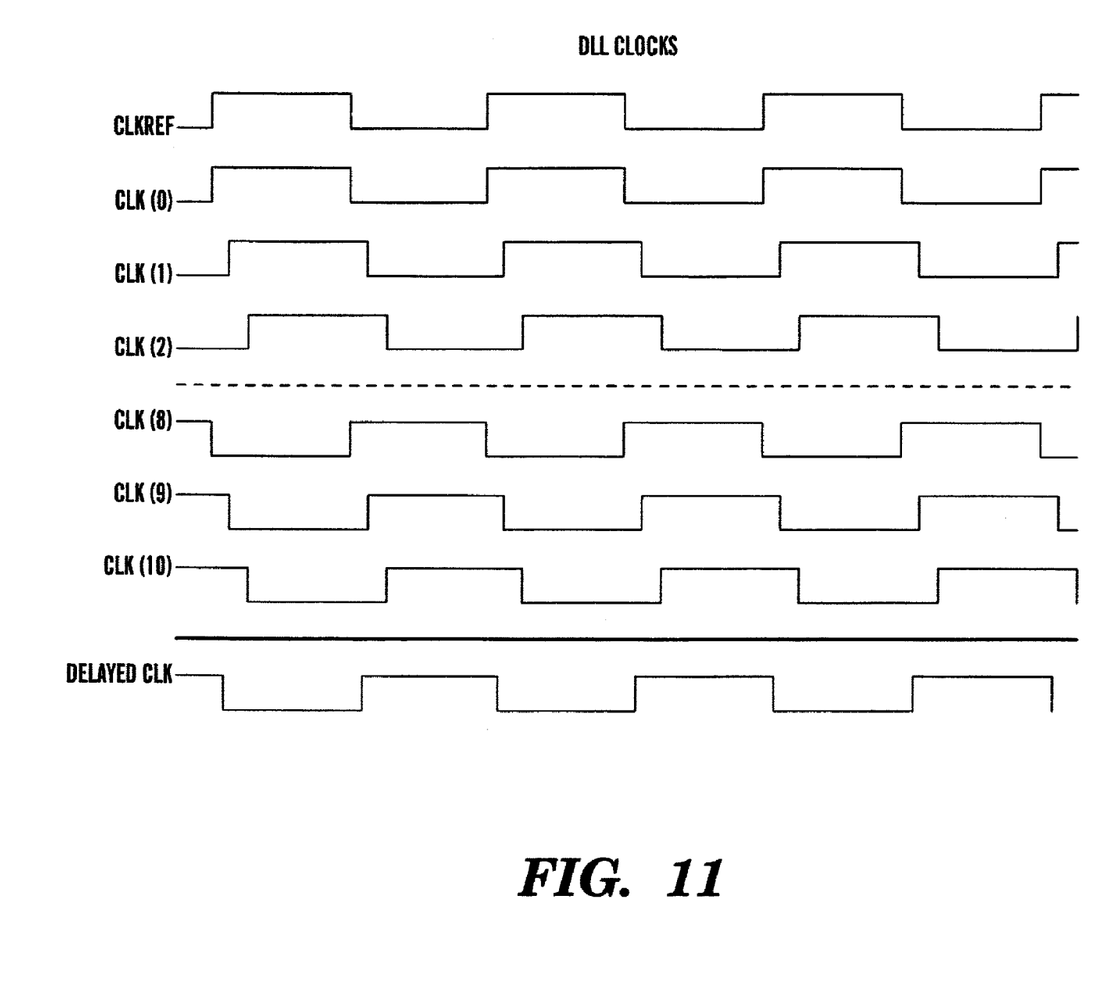
FIG. 11 is a waveform diagram illustrating the operation of the DLL portion of the circuit in FIG. 10.
Figure 12:
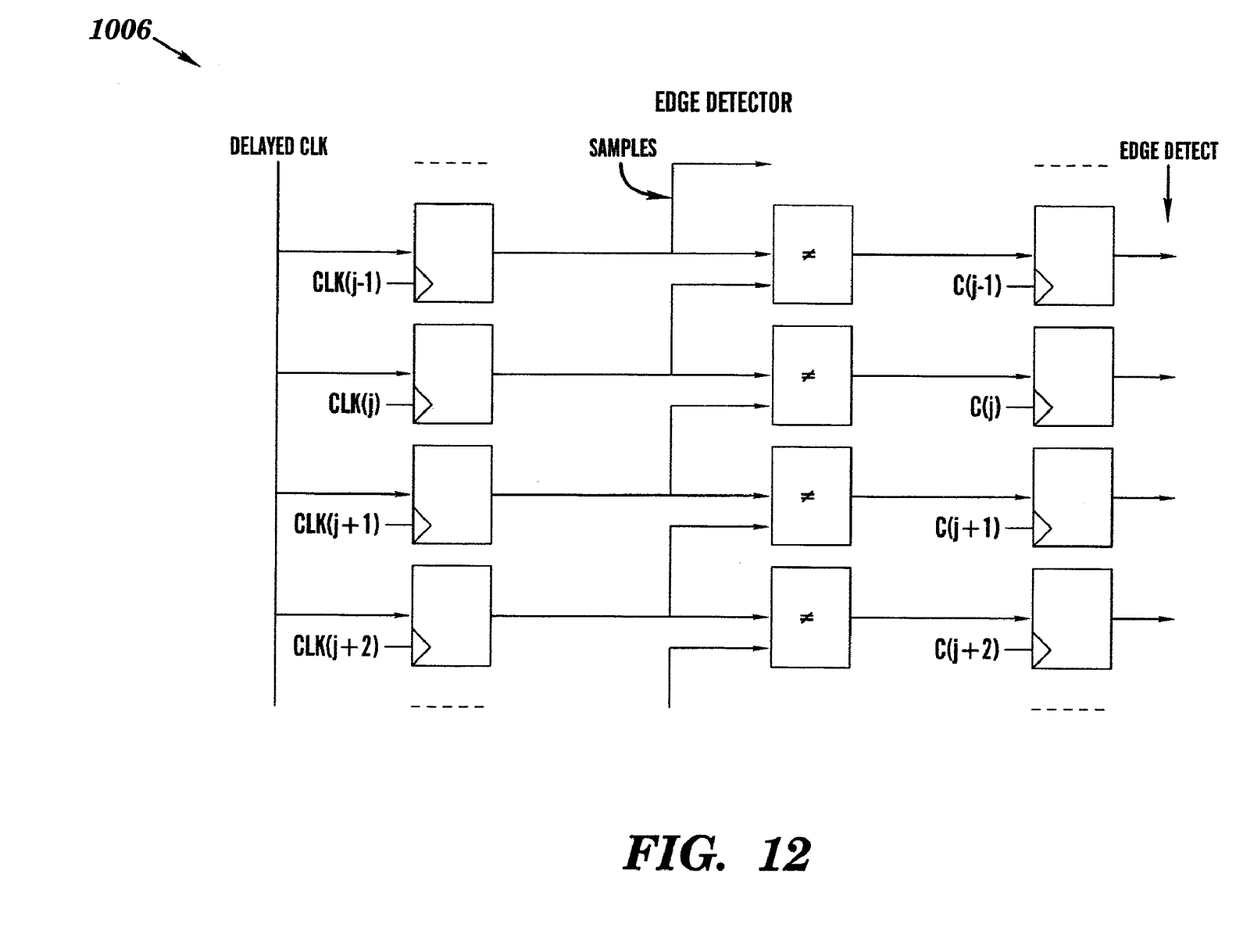
FIG. 12 is a schematic diagram illustrating the operation of the edge detector portion of the circuit in FIG. 10.

Still another digital embodiment of the temperature change determination circuitry 410 is shown in FIG. 10. In lieu of a chain of delay buffers, a digital locked loop (DLL) 1002 having multiple, equally spaced outputs generated from the reference clock signal 412. In this embodiment, an edge detector 1006 is used to compare the delayed clock signal 414 to each of the DLL output signals 1004 (illustrated in the exemplary timing diagram of FIG. 11. The particular output of the DLL 1002 to which the delayed clock signal 414 is most closely matched is recorded by the edge detector 1006 and recorded in latch 1008 during calibration. An exemplary schematic diagram of the edge detector 1006 is shown in FIG. 12. As with the other embodiments, the calibrated value in latch 1008 is compared with a current delay value from the edge detector 1006 to determine whether an elevated temperature condition exists.

In order to help reduce the effects of $V_{DD}$ noise (i.e., spikes), a history buffer may be used to store temperature information before it is sent to the appropriate monitoring system, since $V_{DD}$ noise (as well as temperature differences) may also contribute to increases in path delays. Accordingly, rather than having temperature information immediately sent to the monitoring system, it is instead recorded in a history buffer. After a predetermined amount of time, the values in this buffer are averaged together and then sent to the monitoring system. The operation of the history buffer is illustrated by the flow diagram of FIG. 13.

Figure 13:
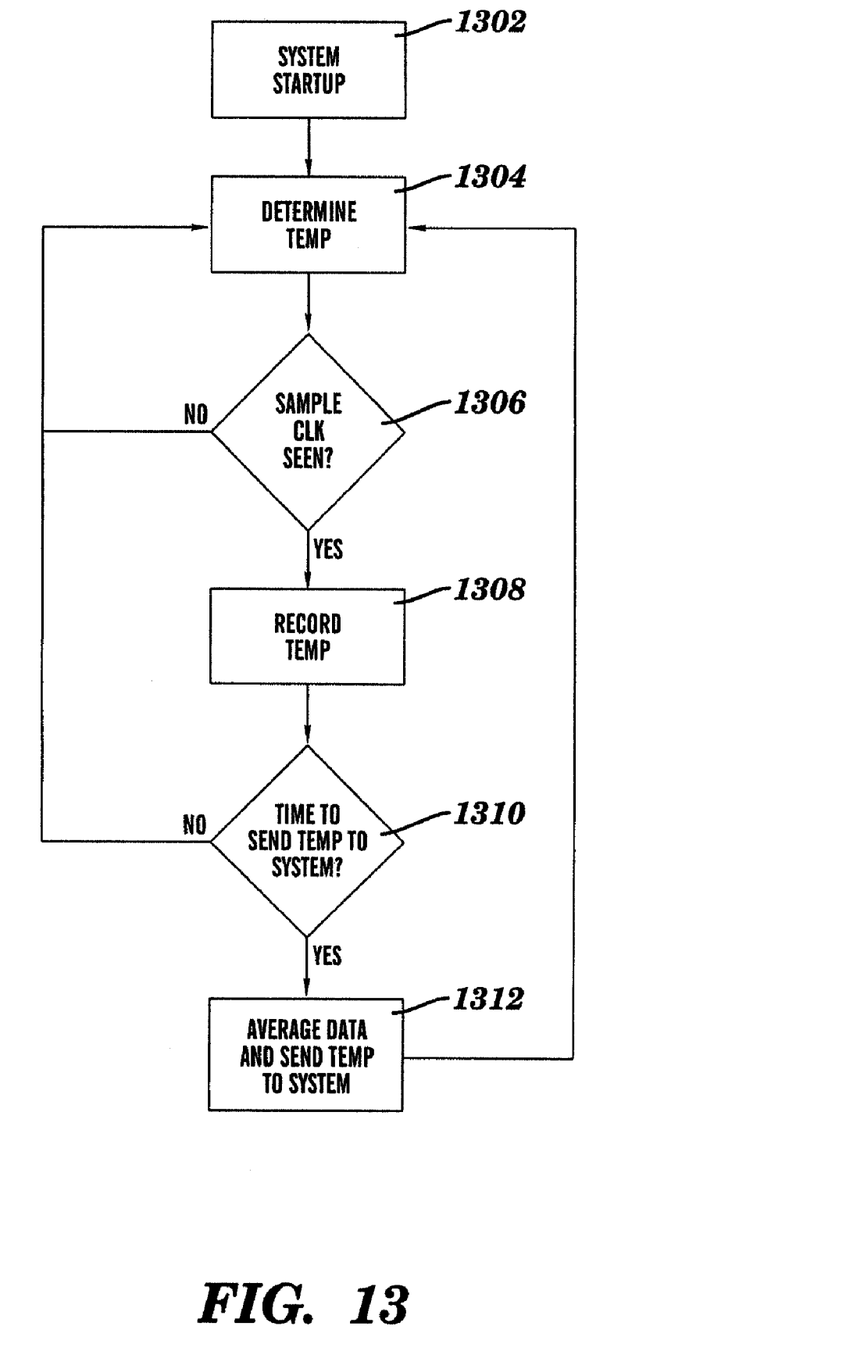
FIG. 13 is a flow diagram illustrating the operation of a history buffer used to store temperature information in accordance with a further embodiment of the invention.

As the IC operates following start up (block 1302), temperature information is constantly be determined in accordance with one or more of the embodiments described above (block 1304). A configurable counter may be used to count to a maximum value, at which time a sample pulse is sent to the history buffer circuitry (decision block 1306), in turn causing the last calculated temperature to be recorded in the history buffer (block 1308). This process is repeated until a second signal is sent to the history buffer (decision block 1310), which causes the history buffer to average all of the values stored therein and send the resulting average value to the monitoring system (block 1312). In this manner, a temporary spike in the "temperature" reading due to, for example, a voltage transient will not erroneously be reported as an actual temperature increase. Moreover, the frequency (maximum count value of the counter) that sends the sample pulse to the history buffer circuitry may be configured such that the intervals during which the temperatures are sampled and recorded are adjusted in real time to account for the actual operating conditions of the IC (e.g., voltage drops, etc.)

As indicated earlier, a calibration sequence may be implemented during system power up that records the measured path delays to be used later for comparison purposes. However, if at some point after system power up, the IC chip were to be reset, the initial calibration information would be lost, although the chip could then be re-calibrated (presumably at some higher baseline temperature, assuming that the overall temperature of the IC is now elevated). On the other hand, if this situation were deemed unacceptable, then one way to alleviate this problem would be to have the reset for the calibration circuitry driven by the power-on reset, while the rest of the IC may be reset by a "softer" reset. (i.e., implement separate reset domains). Still another possibility in this regard would be to eliminate calibration altogether and have the tolerable temperature limits determined prior to fabrication by evaluation and correlation, and then hard-wiring this information into the circuitry itself. Additional information in this regard may be found in U.S. Pat. No. 5,890,100, the contents of which are incorporated by reference herein in their entirety.

Finally, another possible approach is to eliminate the hard-coded temperature limits from the circuitry altogether, and instead hard-code a value which describes a range of allowable limits. For example, the circuitry may be designed to allow 10 degrees of temperature fluctuation. As the temperature of the IC fluctuates, its value is recoded if it is smaller than the minimum recorded temperature or greater than the maximum recorded temperature. Once this range (max–min) exceeds the allowable temperature range, the monitoring system is alerted.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for monitoring the temperature of an integrated circuit device, comprising:
   a conductive wiring pattern formed on the integrated circuit device, extending into multiple areas of the device to be monitored;
   a deterministic signal source configured to generate a deterministic signal along said conductive wiring pattern;
   a plurality of return paths tapped from selected locations along said conductive wiring pattern; and
   a temperature change determination circuit coupled to each of said plurality of return paths and to a single reference signal taken from said deterministic signal source, said temperature change determination circuit configured to determine a delay between said single reference signal and a delay signal traveling though at least a portion of said conductive wiring pattern and a corresponding one of said plurality of return paths, said temperature change determination circuit further configured to compare a difference between a calibrated delay under nominal temperature conditions and a delay under elevated temperature conditions;
   wherein said temperature change determination circuit is further configured to isolate the location of one or more hot spots on the integrated circuit, depending on specific delay information received from said plurality of return paths.

2. The apparatus of claim 1, wherein said conductive wiring pattern comprises a clock tree and said deterministic signal further comprises a clock signal.

3. The apparatus of claim 1, wherein said conductive wiring pattern comprises one or more fingers of a specified length and direction, each of said one or more fingers originating from said deterministic signal source.

4. The apparatus of claim 3, further comprising a plurality of deterministic signal sources having a corresponding set of one or more fingers originating therefrom.

5. The apparatus of claim 1, wherein said temperature change determination circuit further comprises:
   an analog integrator configured to add to the magnitude of a difference signal between said reference signal and a corresponding delay signal, an output of said analog integrator representing a present delay value; and
   a comparator for comparing said calibrated delay value, taken and stored from the output of said analog integrator during said nominal temperature conditions, with said present delay value.

6. The apparatus of claim 1, wherein said temperature determination circuit further comprises:
   a digital device configured to generate a plurality of discrete delay values using said reference signal as a first input thereto, said digital device further receiving a corresponding delay signal a second input thereto and configured to compare said discrete delay values with said corresponding delay signal so as to determine a present delay value; and
   a comparator for comparing said calibrated delay value, taken and stored from the output of said digital device during said nominal temperature conditions, with said present delay value.

7. The apparatus of claim 6, wherein said digital device further comprises:
   a chain of delay buffers, a first one of which is coupled to said reference signal, wherein an output of each represents one of said plurality of discrete delay values; and
   a comparator for comparing said delay signal to said discrete delay values an outputting a number of buffers to which said delay signal most closely matches.

8. An apparatus for monitoring the temperature of an integrated circuit device, comprising:
   a conductive wiring pattern formed on the integrated circuit device, extending into areas of the device to be monitored;
   a deterministic signal source configured to generate a deterministic signal along said conductive wiring pattern;
   one or more return paths tapped from selected locations along said conductive wiring pattern; and
   a temperature change determination circuit coupled to said one or more return paths and to a reference signal taken from said deterministic signal source, said temperature change determination circuit configured to determine a delay between said reference signal and a delay signal traveling through at least a portion of said conductive wiring pattern and a corresponding one of said one or more return paths, said temperature change determination circuit further configured to compare a difference between a calibrated delay under nominal temperature conditions and a delay under elevated temperature conditions, and said temperature change determination circuit further configured to isolate the location of one or more hot spots on the integrated circuit, depending on specific delay information received from said one or more return paths;
   wherein said temperature change determination circuit further comprises a digital device configured to generate a plurality of discrete delay values using said reference signal as a first input thereto, said digital device further receiving a corresponding delay signal a second input thereto and configured to compare said discrete delay values with said corresponding delay signal so as to determine a present delay value;

a comparator for comparing said calibrated delay value, taken and stored from the output of said digital device during said nominal temperature conditions, with said present delay value;

a delay locked loop, coupled to said reference signal and configured to generate a plurality of output signals representing a plurality of discrete delay values; and an edge detector configured to determine which of said discrete delay values said delay signal most closely matches.

9. A method for monitoring the temperature of an integrated circuit device, the method comprising:

defining a conductive wiring pattern on the integrated circuit device, extending into multiple areas of the device to be monitored;

generating a deterministic signal along said conductive wiring pattern;

tapping a plurality of return paths from selected locations along said conductive wiring pattern; and configuring a temperature change determination circuit coupled to each of said plurality of return paths and to a single reference signal taken from said deterministic signal source, said temperature change determination circuit configured to determine a delay between said single reference signal and a delay signal traveling through at least a portion of said conductive wiring pattern and a corresponding one of said plurality of return paths, wherein said temperature change determination circuit is further configured to compare a difference between a calibrated delay under nominal temperature conditions and a delay under elevated temperature conditions; and wherein said temperature change determination circuit is further configured to isolate the location of one or more hot spots on the integrated circuit, depending on specific delay information received from said plurality of return paths.

10. The method of claim 9, wherein said conductive wiring pattern comprises a clock tree and said deterministic signal further comprises a clock signal.

11. The method of claim 9, wherein said conductive wiring pattern comprises one or more fingers of a specified length and direction, each of said one or more fingers originating from said deterministic signal source.

12. The method of claim 11, further configuring a plurality of deterministic signal sources having a corresponding set of one or more fingers originating therefrom.

13. The method of claim 9, further comprising buffering outputs of said temperature change determination circuit for buffering for a determined period of time and outputting an average value therefrom.

14. The method of claim 9, further comprising defining a maximum temperature range of operation for the integrated circuit device.

15. The method of claim 9, wherein said calibrated delay is hard coded onto the integrated circuit device.

16. The method of claim 9, wherein said calibrated delay is generated during a power-on reset condition of the integrated circuit device.

* * * * *